Oct. 31, 1950 — R. H. LOETHER — 2,527,639
LOCKING CASTER
Filed March 30, 1948
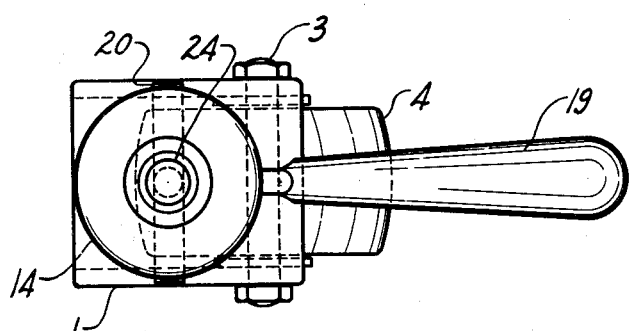
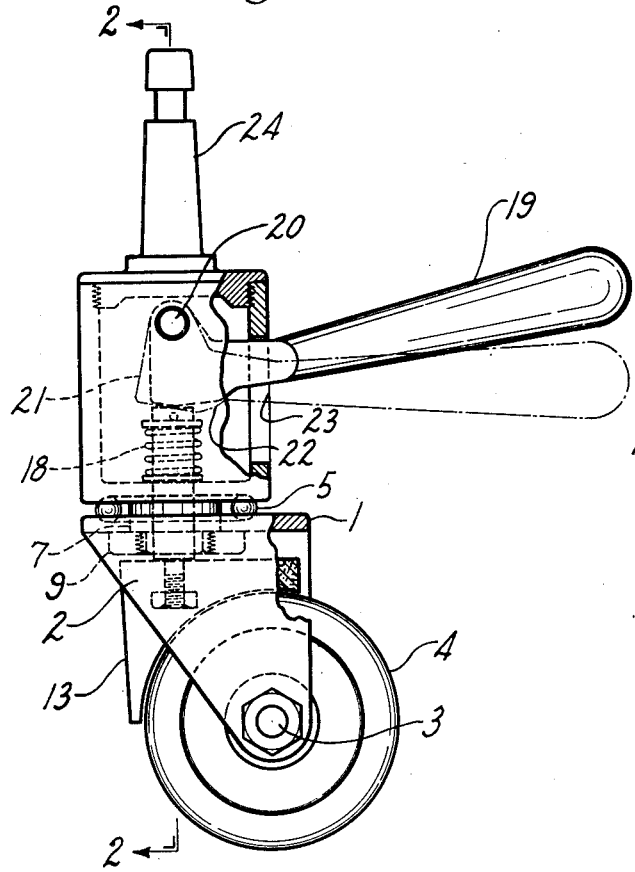
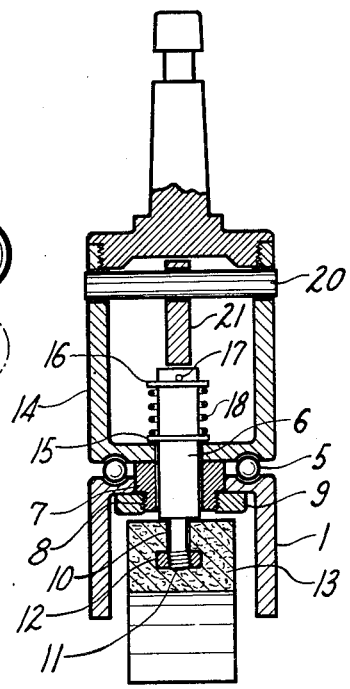
INVENTOR.
Raymond H. Loether
BY William B. Jaspert
Attorney.

Patented Oct. 31, 1950

2,527,639

UNITED STATES PATENT OFFICE 2,527,639

LOCKING CASTER

Raymond H. Loether, Pittsburgh, Pa.

Application March 30, 1948, Serial No. 17,829

1 Claim. (Cl. 16—21)

This invention relates to new and useful improvements in casters of the heavy duty type, and it is among the objects thereof to provide a caster which may be locked to thereby render immobile the appliance supported thereon.

The invention will become more apparent from a consideration of the accompanying drawing, constituting a part hereof, in which like reference characters designate like parts, and in which Fig. 1 is a side elevational view, partially in section, of a caster embodying the principles of this invention;

Fig. 2 a vertical cross sectional view thereof taken along the line 2—2, Fig. 1; and Fig. 3 a top plan view of the caster shown in Fig. 1.

In the drawing the numeral 1 designates a swivel bracket having triangular side walls or cheek plates 2 for supporting an axle 3 on which is journaled a wheel 4. Bracket 1 is provided with an antifriction bearing 5 for supporting the load on the caster while permitting swivel movement of the bracket 1. As shown in Fig. 2, the swivel bracket 1 is provided with a center pin 6 which is mounted in a bearing 7 having threaded engagement at 8 with a retaining ring nut 9. The bottom of the center pin 6 is provided with a reduced body milled portion 10 having a threaded end 11 for receiving a nut 12 by means of which a brake shoe 13 of hard fiber or other suitable material is secured. The brake shoe is of the curvature of the wheel 4 and has frictional engagement therewith when the center pin 6 is pressed downwardly.

The center pin 6 extends through a cylindrical housing 14 in which it is secured by washers 15 and 16, the latter being held against displacement by a pin 17. A coil spring 18 is disposed between the washers 15 and 16 to normally bias the center pin 6 to its raised position, in which position the brake shoe 13 is out of engagement with the wheel 4.

Center pin 6 may be depressed to lock the brake shoe 13 with the wheel 4 and to lock the bracket 1 against swivel movement by a lever 19 which is pivoted in the cylindrical housing by a pin 20 extending through the walls of the housing 14. One end of lever 19 is provided with a cam 21 having a relatively flat cam face 22, as shown in Fig. 1, so that the lever 19 cannot be displaced by pressure of the center pin 6 acting against the cam face. The cylindrical housing 14 is provided with a slot 23 to permit angular movement of the lever 19, as shown in the dotted line construction of Fig. 1, to have the cam face 22 act upon the center pin to depress it in a downward direction. When the lever 19 is raised to clear the top of the center pin, the spring 18 returns the center pin to its raised position.

The cylindrical housing 14 is provided with a caster shank 24 which fits into the socket of a leg of an appliance, such as a washing machine, or a portable truck for use on loading platforms, or the like. In operation the lever 19 acts to lock the wheel 4 by depressing center pin 6 in a downward direction, and in doing so the swivel bracket 1 is also locked against swivel movement by virtue of contact of the brake shoe 13 with the wheel and the top of the center pin 6 with the face 22 of the cam.

The caster is particularly designed for heavy duty use on appliances and loading trucks where, by simply pressing the foot on the lever 19, the caster wheel and swivel are both locked against movement. By raising lever 19 the brake and swivel are simultaneously released to render the appliance or truck readily movable. In the case of washing machines and the like, only one of the casters needs to be of the locking type as herein disclosed, but obviously two or more of such casters may be provided, or two casters may be locked by a single lever with appropriate connecting linkage.

Although one embodiment of the invention has been herein illustrated and described, it will be apparent to those skilled in the art that modifications may be made in the details of construction without departing from the principles herein set forth.

I claim:

A caster comprising a swivel bracket having a wheel journaled therein, a caster shank having a hollow housing mounted on said bracket, a center pin extending through the top wall of the bracket and into said housing, antifriction bearings disposed between the bracket and the housing, a brake shoe mounted on the bottom end of the center pin adapted to engage the outer periphery of the wheel, and a spring mounted on the upper end of the center pin in the housing to normally bias the center pin in the direction to raise the brake shoe, and a locking lever pivotally mounted in the housing having a flat faced cam adapted to engage the top of the center pin to depress the latter against the action of the spring to effect engagement of the brake shoe and caster wheel and to lock the swivel bracket against swivel movement.

RAYMOND H. LOETHER.

REFERENCES CITED

The following references are of record in the file of this patent:

UNITED STATES PATENTS

| Number | Name | Date |
|---|---|---|
| Re. 16,864 | Perin | Jan. 31, 1928 |
| 875,245 | Darrow | Dec. 31, 1907 |
| 1,354,088 | Burchell | Sept. 28, 1920 |
| 2,138,433 | Sunden | Nov. 29, 1938 |
| 2,188,648 | Bouvier et al. | Jan. 30, 1940 |

FOREIGN PATENTS

| Number | Country | Date |
|---|---|---|
| 192,540 | Switzerland | Nov. 1, 1937 |
| 421 | Great Britain | of 1866 |